H. BERDAN.
Bake Oven.
No. 18,429.
2 Sheets—Sheet 1.
Patented Oct. 20, 1857.
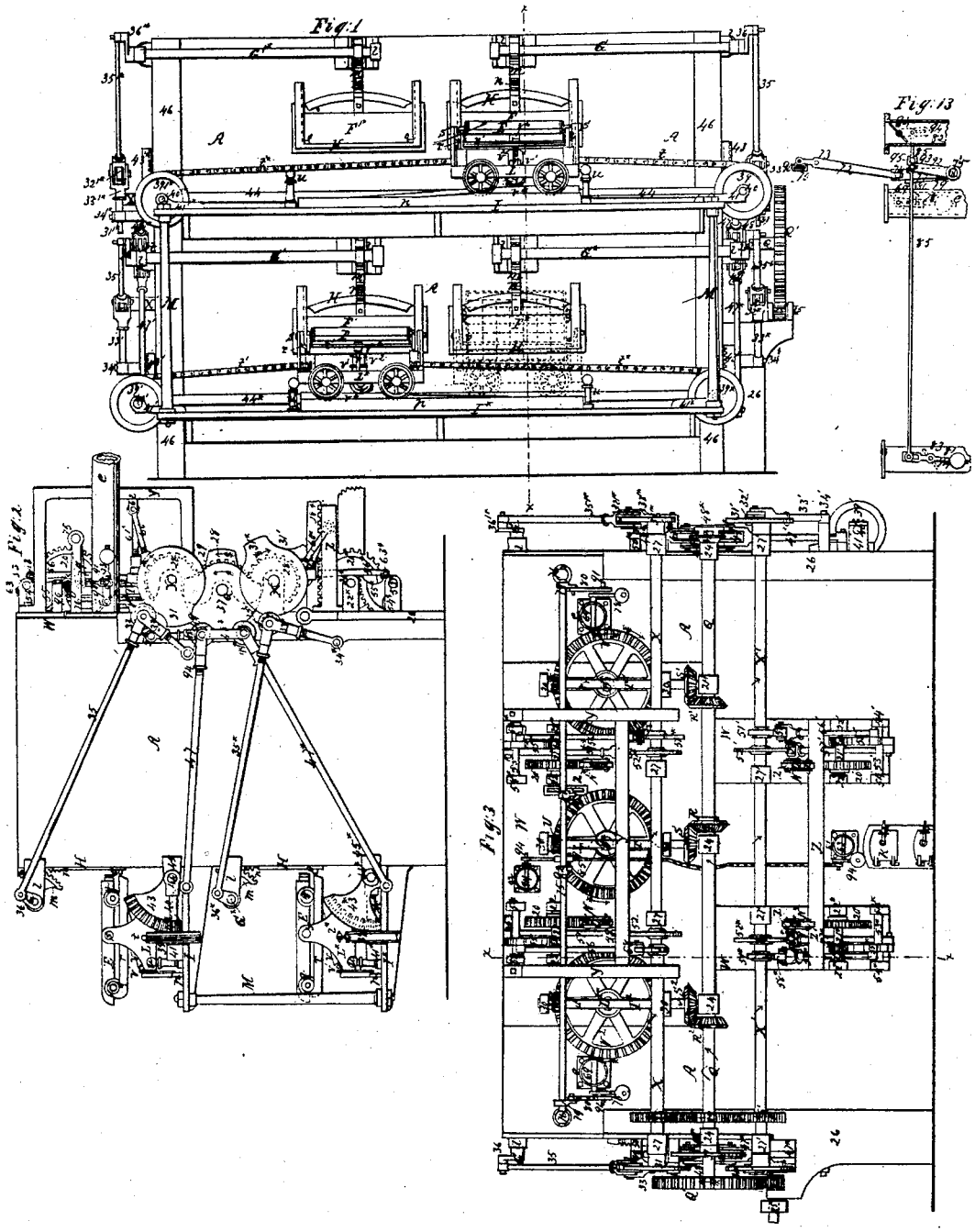

H. BERDAN.
Bake Oven.
No. 18,429.
2 Sheets—Sheet 2.
Patented Oct. 20, 1857.
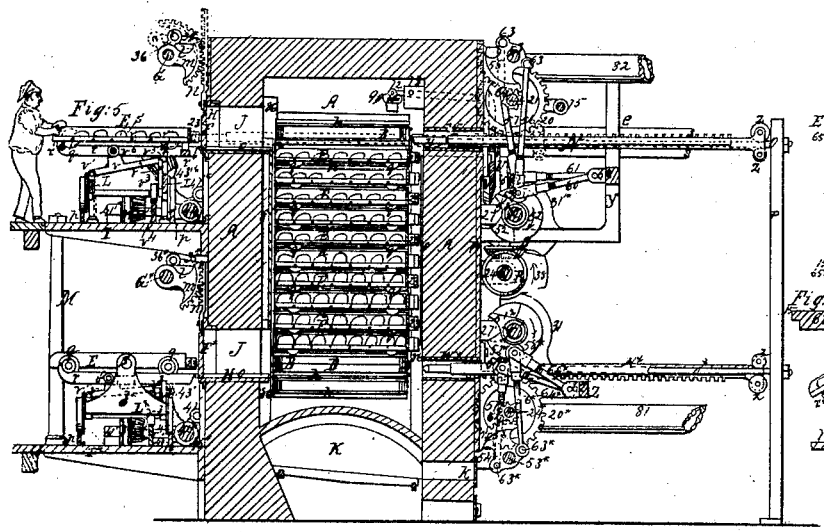
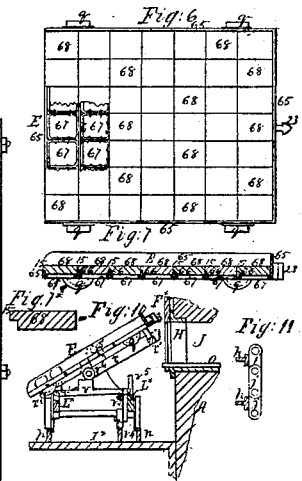
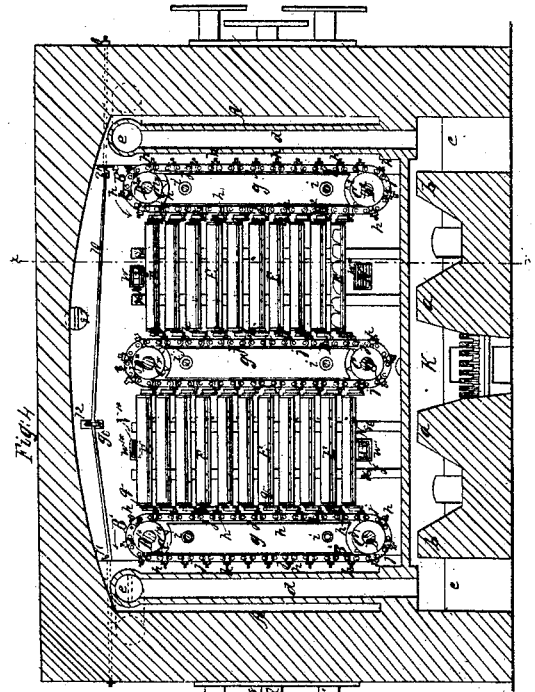
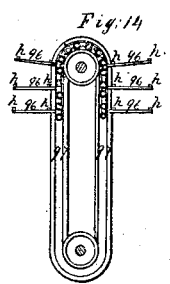

UNITED STATES PATENT OFFICE.

HIRAM BERDAN, OF NEW YORK, N. Y.

BAKER'S OVEN.

Specification forming part of Letters Patent No. 18,429, dated October 20, 1857; Reissued September 11, 1860, No. 1,035.

*To all whom it may concern:*

Be it known that I, HIRAM BERDAN, of the city, county, and State of New York, have invented certain new and useful Improvements in Bakers' Ovens; and I do hereby declare that the following is a full, clear, and exact description of the same, reference being had to the accompanying drawings, making part of this specification, in which—

Figure 1, is a front elevation of an oven to which my invention is applied. Fig. 2 is an end elevation of the same. Fig. 3 is a back elevation of the same. Fig. 4 is a vertical section in a plane parallel with Fig. 1. Fig. 5 is a vertical section parallel with Fig. 2, in a plane indicated by the line $x, x$, in Figs. 1, 3, and 4. Figs. 6, 7, 7*, 8, 9, 10, 11, 12, 13, 14, and 15, are detail views that will be hereinafter referred to.

Similar letters of reference indicate corresponding parts in the several figures.

My invention consists in furnishing the interior of an oven with one or more moving upright endless chains carrying one or more series of tracks or their equivalent, which, during a great portion of the movement of said endless chains, constitute horizontal shelf-like supports on which the bread or other substance or substances to be baked is conveyed with a vertical or nearly vertical movement from a door or doors through which it is introduced to the oven by machinery provided for that purpose to a door or doors through which it is withdrawn therefrom by other machinery when sufficiently baked, the time occupied in such conveyance being just sufficient for the baking process, which is made continuous for any length of time by the introduction of new supplies as fast as the discharges take place; the oven being thus kept constantly filled with the bread or other substance or substances at progressive stages of the baking process.

To enable others skilled in the art to make and use my invention I will proceed to describe its construction and operation.

A, is the oven, built of brickwork or masonry and strengthened with iron plates, of quadrangular form in its transverse section, having upright sides and an arched roof and an arched bottom, with its fireplace K, under the bottom; said fireplace having bridge walls $a$, and $b$, on each side, over which the products of combustion have to pass, under the entire bottom of the oven, to the two main horizontal flues $c, c$, from whence they pass through a number of upright fire-clay-pipe flues $d, d$, which line the sides of the oven and communicate with two horizontal main flues $e, e$, close to the roof, which latter flues, are intended to enter a connecting flue outside the oven communicating directly with the chimney.

$k$, is the fire door at the back of the oven.

B, B$^1$, B$^2$, are three pairs of upright endless chains within the oven, fitted to run on sprocket wheels, C, C*, C$^1$, C$^{1*}$, C$^2$, C$^{2*}$, which are secured on three pairs of parallel horizontal shafts D, D*, D$^1$, D$^{1*}$, D$^2$, D$^{2*}$, which are fitted to rotate in suitable bearings in plates $f, f$, which are secured to the front and back of the interior of the oven; the said plates being stayed by stays $i, i$, see Fig. 4; one pair D, D*, of said shafts being arranged with their axes in a vertical plane passing through the center of the oven, one shaft near the top and the other near the bottom of the oven; and the other two pairs having their axes arranged in vertical planes at equal distances from the central pair on opposite sides thereof, near the ends of the oven, and at corresponding elevations, as shown in Fig. 4; each pair of shafts carrying on its four sprocket wheels one pair of endless chains, and the chains and sprocket wheels being arranged nearly close to the back and front of the oven as is shown in Fig. 5.

The endless chains are kept in upright positions between their respective sprocket wheels by means of upright projections $g, g$, (see Fig. 4) on the two plates $f, f$, which projections enter and fit easily between the sides of the chains. The two endless chains which constitute one pair, that is to say the two which are hung on the same pair of shafts, are connected together at equal distances by horizontal bars $h, h$, which are bolted to or cast with alternate links $j, j$, of the two chains, as shown in Fig. 4, and further illustrated in Figs. 11 and 12, the former of which figures is a front view on a larger scale than Fig. 4, of three links of one of the chains, exhibiting the bars $h, h$, in section, and the latter is a side view of three links of each chain of one pair and two connecting bars, on a scale to correspond with Fig. 11. The bars $h, h$, which it will be observed are on the outer faces of the chains, constitute tracks extending from the front to the back of the oven, to support cars E, E, E, E, on which the bread or other substance or substances to be baked are run into and from the oven and supported while in the oven undergoing the baking process; one side of each car being supported by a bar $h$, on the straight portion of the center pair of chains B, and the other by a bar $h$, on the straight portion of one of the side chains $B^1$, or $B^2$. The shafts of the chains are so geared by their driving gear hereinafter to be described, that each bar $h$, on the straight portions of the central pair of chains B, that is to say the portions that are free of the sprocket wheels, is exactly on the same level as a bar of the nearest side of the nearest outer pair of chains $B^1$, or $B^2$, so as to suport the cars in a perfectly horizontal position, as is illustrated in Fig. 4. The distances between the several bars $h, h$, taken vertically on straight portions of the chains, is only just sufficient to allow about from four to eight inches of clear space between the tops of the loaves or other articles on the cars and the bottoms of the cars above, so that as many cars as possible may be contained in the oven at the same time. The chains have severally a continuous motion in such direction (indicated by arrows in Fig. 4) that the cars supported by the chains $B, B^2$, are always descending and those supported by the chains $B, B^1$, always ascending. The plates $f, f$, which line the back and front of the oven, are furnished with upright projecting pieces 86, the faces of which serve to guide the ends of the cars in their ascent and descent.

F, $F^*$, $F^1$, $F^{1*}$, are four vertically sliding doors, fitted to openings in front of the oven, said openings being of a height and width sufficient for the cars E, E, when loaded with bread or other material to pass through, to and from the oven; two of said openings to which are fitted the doors F, and $F^*$, being situated opposite the space between the chains B and $B^2$, and the other two openings to which are fitted the doors $F^1$ and $F^{1*}$ being situated opposite the space between the chains B and $B^1$; the two openings belonging to the doors F and $F^{1*}$, being on the same level with each other, or nearly so, near the top of the straight portions of the chains, and the other two belonging to the doors $F^1$ and $F^*$, being on the same level with each other, or nearly so, near the bottom of the straight portions of the chains. The bottoms of the door frames H, H, H, H, which line the openings J, J, to which the doors are fitted, are provided with raised tracks $o, o$, (see Fig. 5) corresponding in distance apart and position with the tracks $h, h$, for the wheels $g, g$, of the cars E, E, to run on, on their way into and from the oven. The doors F and $F^1$ admit the cars to the oven with the unbaked bread, and those $F^*$ $F^{1*}$, serve for the exit of the cars with the bread after it is baked. The velocity of the movement of the chains is such that the time occupied by the several cars in their movement from the door F to the door $F^*$, or from the door $F^1$ to the door $F^{1*}$, is just sufficient for the baking process.

G, $G^*$, $G^1$, $G^{1*}$, are four horizontal shafts, fitted to work in bearings in brackets $l, l$, secured to the front of the oven; one of the said shafts being situated above each of the four doors and each carrying a toothed sector $m$, gearing with an upright toothed rack $n$, attached to its respective door, for the purpose of opening and closing the doors by proper movement imparted to the shafts in the manner hereinafter described, at proper intervals of time for the entrance and exit of the cars as the track bars $h, h$, severally arrive on a level with the bottoms of the openings.

I, $I^*$, are two iron platforms, situated in front of the oven at such a distance below the openings J, J, as is convenient for men standing upon said platforms to load the cars when the latter are properly supported at a proper level to run into the oven. These platforms which are level with two floors of the bakehouse are stayed together by pillars M, M, and have upon them tracks $p, p$, parallel with the front of the oven, (see Figs. 1, 2, and 5) along which tracks travel two wheeled carriages L, $L^*$, upon which the cars E, E, are received as they leave the oven by the discharging doors $F^*$, $F^{1*}$, and by which they, after having been unloaded, are conveyed to positions opposite the receiving doors F, $F^1$, to be in readiness to enter the oven again when the latter doors are opened at the proper time; the movements of the said carriages along the tracks, $p, p$, for the above purpose being effected through the agency of chains $t, t^*, t^1, t^{1*}$, (see Fig. 1) which are operated by means hereinafter described and said movements being limited by stationary stops $u, u$. Each of the carriages L, $L^*$, which are both alike, is provided respectively with a tilting frame $r, r, r^1, r^1$, the two side rails $r, r$, of which, when the carriage is opposite one of the doors, form continuations of the tracks $o, o$, and of any of the tracks $h, h$, that may happen to be at the right level, so that the cars may run from the oven directly on to the rails $r, r$, or vice versa. Those ends of the rails $r, r$, which are farthest from the oven are turned up, as shown in Figs. 2 and 5, to stop the wheels $q, q$, when the cars have run far enough out of the oven to allow the doors to close. The tilting frame $r, r, r^1, r^1$, of each of the carriages L, $L^*$, is balanced on two pivots $s$, $s$, which are supported in the ends of the carriage, but it is so arranged that when a loaded car is received upon it from the oven, its outer end shall be overbalanced by the weight of the car, and it with the car upon it shall be caused to assume an inclined position so that the bread or other baked substance or substances will slide off the car into a suitable receptacle, while the car is retained upon the rails $r$, $r$, by the turned-up ends of said rails. This operation of the tilting frame is illustrated in Fig. 10, which represents a vertical section of the discharging door F*, with the carriage L* opposite to it; the latter having received a car which has just tilted the frame $r$, $r$, $r^1$, $r^1$, and thus been caused to discharge its bread or other baked substance or substances. The same carriage is represented in the same condition in red outline in Fig. 1. The tilting frame $r$, $r$, $r^1$, $r^1$ of each carriage is returned to a horizontal position while the carriage is on its way from the discharging to the receiving door, by means of a lever $v$, of the second order, (see particularly Figs. 5 and 10, but also Fig. 1,) which lever is attached at one end by a fulcrum pin $v^1$, to that side of the body of the carriage that is farthest from the oven and which has its other end supported in a notch in an upright silding piece $v^2$, working in a guide attached to that side of the body of the carriage that is nearest to the oven. This upright sliding piece $v^2$, has a wheel $v^3$, attached to it, which runs on a rail $v^4$, between the rails $p$, $p$; said rail $v^4$ having an upward inclination from the discharging toward the receiving door, as shown in Fig. 1. An anti-friction roller $v^6$, is attached to the tilting frame in a position between its pivots $s$, $s$, and its outer end; see Fig. 5. When the carriage is opposite the discharging door, the wheel $v^3$, of the sliding piece $v^2$, being at the bottom of the inclination of the rail $v^4$, allows the sliding piece to occupy a low position relatively to the tilting frame, and the lever $v$, hangs down low enough to allow the tilting frame to come to the inclined position shown in Fig. 10; but as the carriage runs toward the receiving door, the wheel $v^3$, in running up the inclined face of the rail $v^4$, causes the sliding piece $v^2$, to lift the lever $v$, gradually; and said lever coming in contact with the roller $v^6$, lifts up the outer end of the tilting frame and replaces it in a horizontal position and holds it in that position with the car upon it, opposite the receiving door, in readiness to be reloaded and run into the oven at the proper time. When the tilting frame is in a horizontal position, the end nearest the oven has a bearing upon a rest $v^5$, attached to the carriage. The loading of the cars is performed by hand, as is represented in Fig. 5.

$w$, is an aperture in the back of the oven opposite the door F, to admit a pair of spring tongs $y$, attached to a long horizontal iron bar N, which is fitted with rollers $z$, $z$, to run upon a stationary horizontal bar O, which is attached at its front end to the back of the oven and supported at its rear end by an upright frame P, see Fig. 5. This bar N is furnished with a toothed rack gearing with a spur wheel 20, on a short horizontal shaft 21, arranged in suitable bearings in brackets 22, 22, forming parts of a large casting W, secured to the back of the oven, which shaft is operated at proper intervals by means hereinafter described, to make the spur wheel act upon the rack and drive the bar N, quickly through the oven every time a pair of rails $h$, $h$, of the chains B, B², arrive on a level with the tracks $o$, $o$, inside the door F, for the purpose of seizing hold of the loaded car of unbaked bread or other substance or substances that is at the time waiting opposite the said door, and return as quickly, drawing the said car along the tracks $o$, $o$, and $h$, $h$, into the oven. The operation of the bar N, and tongs $y$, is illustrated in Figs. 5 and 8, the latter of which figures exhibits a horizontal section of the aperture J, of the door F, and a plan of the bar N, and one of the cars inside the oven and another outside. The stationary position occupied by the bar N, and tongs $y$, after having drawn a car into the oven, and while in waiting to run through the oven when the proper time arrives to fetch another car, is represented in Figs. 5 and 8, in black outline; and their position at the time of just having seized a car, in red outline. The tongs have latches at their extremities, which spring past a double hook 23, which is provided on the back of each car, and these latches and the hook 23, attach the car to the bar N. After the car has been drawn into the oven, it is liberated from the tongs by its descent with the chains, while the bar and tongs remain in the position shown in black outline; and as soon as the car has moved entirely below the tongs, the latter are at liberty to run in to fetch another car at the proper time.

$w^1$ is an aperture like $w$, in the back of the oven opposite the door F¹, to admit a pair of spring tongs $y^1$, attached to a bar N¹, like N, sliding on a similar bar O¹, attached to the oven and to the frame P. The bar N¹, and tongs $y^1$, are operated substantially like the bar N, and tongs $y$, to fetch the cars through the doors F¹, on to the ascending tracks $h$, $h$, of the chains B, B¹, the only difference in the operation being that the hooks 23 of the cars liberate themselves from the tongs $y^1$, by an upward instead of a downward motion.

$21^1$, is the shaft and $20^1$, the spur gear by which the bar N¹ is driven into and out of the oven; said shaft being, like that 21, hung in bearings in brackets $22^1$, $22^1$, on the casting W.

$w^*$, is an aperture in the back of the oven, opposite the door $F^*$ to admit a bar $N^*$, which is provided with a broad T-shaped end, and runs on a bar $O^*$, that is similarly arranged to O, and $O^1$; said bar $N^*$ being for the purpose of pushing out the cars E, E, through the open door $F^*$, as the descending tracks $h$, $h$, of the chains B, $B^2$, severally arrive at a proper level. The bar $N^*$ is driven through and drawn back out of the oven in a similar manner to the bars N, and $N^1$, by means of a spur wheel $20^*$, on a short horizontal shaft $21^*$, supported in bearings in brackets $22^*$, $22^*$, on the casting W; the said spur wheel $20^*$ gearing with a rack on the under side of the bar. $w^{1*}$, is another aperture in the back of the oven, situated opposite the door $F^{1*}$, and serving to admit a bar $N^{1*}$, like $N^*$, that is fitted to run on a bar $O^{1*}$, that is similarly arranged to O, $O^1$, $O^*$, said bar $N^{1*}$ being for the purpose of pushing the cars through the open door $F^{1*}$, as they are severally brought to a proper height by the ascending movement of the chains B, $B^1$. The bar $N^{1*}$, is driven through the oven for the above purpose and drawn back again in a similar manner to $N^*$, by means of a spur wheel $20^{1*}$, gearing with a rack on its upper side; said spur wheel $20^{1*}$ being secured to a short horizontal shaft $21^{1*}$, fitted to run in bearings in brackets $22^{1*}$, on the casting W. Fig. 9 represents a plan of the bar $N^{1*}$, and that figure also serves to illustrate the form of the bar $N^1$, as that only differs from $N^{1*}$, in having its toothed rack on the under side. The bars $N^1$, $N^*$, $N^{1*}$, are all, like N, provided with rollers $z$, $z$, to run on their guide bars $O^1$, $O^*$, $O^{1*}$. All these bars are shown in the back view of the oven, Fig. 3, where the frame P is omitted, to expose the driving mechanism by which the movements of the chains, doors, cars, and carriages are effected.

Q, is the main shaft from which the movements of all the machinery belonging to the oven are derived; the said shaft being supported in a horizontal position, parallel with the back of the oven, in bearings in brackets 24, 24, on the casting W, and having a rotary motion at a slow speed imparted to it through a large spur wheel Q, secured on one end of it, from a pinion $25^*$, on a shaft 25, which works in bearings attached to a strengthening plate 26, at one corner of the back of the oven, and which shaft is intended to derive motion through a belt and two cone pulleys from the shaft of a steam engine or other first mover. The main shaft Q, is furnished with three bevel wheels R, $R^1$, $R^2$, gearing with three other bevel wheels S, $S^1$, $S^2$, on three upright shafts T, $T^1$, $T^2$, the bottoms of which rest in steps in three of the brackets 24, and the upper ends of which work in bearings in three brackets 30, on the casting W; and said shafts T, $T^1$, $T^2$, carry three bevel pinions U, $U^1$, $U^2$, gearing with three large bevel wheels V, $V^1$, $V^2$, on the rear ends of the three chain shafts $D^*$, $D^{1*}$, $D^{2*}$. The above described train of bevel gearing thus serves to impart motion from the main shaft to the chains B, $B^1$, $B^2$.

X, is a shaft, arranged above and parallel with the main shaft Q, in bearings in brackets 27, in the two corner plates 26, and casting W, and receiving rotary motion at the same velocity as the main shaft Q, through a spur wheel 28, fast upon it, from a spur wheel 29, on the main shaft Q. This shaft X, is furnished at one end (seen to the left hand of Fig. 3, and right hand of Fig. 1) with a cam 31, whose form is visible in Fig. 2, that rotates in contact with a roller 32, (see Figs. 2 and 3) at the end of an arm 33, which is fitted to swing on a pivot 34, secured in the corner plate 26, and which is connected by a rod 35, with a short arm 36, that is fast on the end of the shaft G. The above mentioned cam, by its rotary movement in contact with the roller, gives, through the arm 33, rod 35, and arm 36, the necessary movement to the shaft G, for the sector $m$, by its action on the rack $n$, to open the oven door F, at the proper time for the rod N, with its tongs $y$, to run forward and draw a loaded car from the carriage L, into the oven. The cam only keeps the door open long enough to admit the car. The door closes again by its own weight, assisted by the weight of the rack $n$, arm 33, and rod 35, all of which are so disposed as to make the roller descend the off-set of the cam. At the opposite end of the same shaft X, there is a cam $31^{1*}$, which is like unto the cam 31, and operates in a similar manner upon a roller $32^{1*}$, attached to an arm $33^{1*}$, (see Fig. 3) which swings on a pivot 34, and is connected by a rod $35^{1*}$, with an arm $36^{1*}$, on the shaft $G^{1*}$; said roller, arms, and rod being arranged like those just above described as being operated upon by the cam 31, and being operated upon in a similar manner to move the shaft $G^{1*}$, to open the door $F^{1*}$, by means of the proper sector $m$, and rack $n$, at the proper time for a car of baked bread or other substance or substances to be pushed by the rod $N^{1*}$, out of the oven on to the carriage L.

$X^1$, is a shaft like X, arranged below and parallel with the main shaft Q, in bearings in brackets $27^1$, in the two corner plates 26, and casting W, and receiving motion at the same speed as the main shaft Q, through a spur wheel $28^1$, fast upon it, from the spur wheel 29, which drives the shaft X. The shaft $X^1$ is furnished at one end (seen to the left hand of Fig. 3) with a cam $31^*$, like the cams 31, and $31^{1*}$, that rotates in contact with a roller 32*, attached to the end of an arm 33*, (see Figs. 2 and 3) which works on a fixed pivot 34*, secured in the corner plate 26, and which is connected by a rod 35*, with an arm 36*, on the shaft G*. The roller 32*, arm 33*, rod 35*, and arm 36*, are operated upon by the cam 31*, in a similar manner to that in which the corresponding rollers, arms, and rods, in connection with the cams on the shaft X, are operated to give the necessary movement to the shaft G*, to cause the proper sector $m$, and rack $n$, to open the door F*, at the proper time to allow the bar N*, to push out a car of baked bread or other substance or substances from the oven on to the carriage L*. At the opposite end of the same shaft $X^1$, there is a cam $31^1$, (like 31, $31^{1*}$, and 31*) which operates (in a similar manner to those cams) upon a roller $32^1$, arm $33^1$, rod $35^1$, and arm $36^1$, to give to the shaft $G^1$, the movement necessary for the proper sector $m$, and rack $n$, to open the door F at the proper time for the bar $N^1$, with its tongs $y^1$, to pull a loaded car from the carriage L*, into the oven. All the cams above described are of such form and so arranged, and the doors are also so arranged, that one door is closed before another is opened, and only one is allowed to be open at a time, and thus no drafts of cold air can be induced through the oven by the opening of the doors. The doors open in the following order: F, $F^1$, $F^{1*}$, F*.

The shaft Q, in addition to the spur and bevel wheels before described, carries two cams 37 and 38, the former near that end of the said shaft seen to the left hand of Fig. 3, and the latter at that end seen to the right hand of the same figure. These cams are for the purpose of transmitting motion to the chains $t$, $t^*$, $t^1$, $t^{1*}$, for the purpose of moving the carriages L, L*, to convey the cars from the discharging doors F*, $F^{1*}$, to the receiving doors $F^1$, F. The mechanism through which motion is transmitted from the cams to the chains is as follows:—The two chains $t$, $t^*$, which are connected with the carriage L, are respectively attached in a secure manner to two wheels 39, and $39^{1*}$, upon two shafts 40 and $40^{1*}$, which are arranged in bearings 41, $41^{1*}$, supported by the platform I; and these shafts carry two bevel wheels 42, $42^{1*}$, which gear with two bevel toothed sectors 43, $43^{1*}$, on a long horizontal rockshaft 44, which is arranged parallel with the front of the oven, just above the platform I, in bearings in brackets 45, 45, attached to the two front corner plates 46, 46, of the oven. The sector 43, is connected by a rod 47, with an arm 48 (see Figs. 2 and 3) which hangs on a fixed pin 50, secured in one of the back corner plates 26, and carries at its lower end a roller 49, which rests against the cam 37; and the sector $43^{1*}$, is connected similarly to that 43, by a rod $47^{1*}$, with an arm $48^{1*}$ (see Fig. 3) which carries a roller $49^{1*}$, that rests against the cam 38. The forms of the two cams 37, 38, and the arrangement of the several parts of the mechanism above-described are such that the two sectors are operated upon by their respective cams to move both shafts 40, $40^{1*}$, through the bevel wheels 42, $42^{1*}$, in similar directions, so that as one of the chain wheels 39, or $39^{1*}$, winds up its respective chain $t$, or $t^{1*}$, the other lets off its respective chain; and the forms of the two cams and their arrangement upon the shaft Q, are such that through the operation of the mechanism above described upon the chains $t$, $t^{1*}$, the carriage L is caused to arrive opposite the door $F^{1*}$, just before that door opens; and after a car of baked bread or other substance or substances has been run out on to the said carriage, the latter is almost immediately run along its track $p$, $p$, to the door F, where it remains stationary till the latter door has opened and the bar N, with its tongs $y$, has drawn the car into the oven; the time that the car is stationary opposite the latter door being sufficient for the car to be loaded by an attendant. The two chains $t^*$, $t^1$, which are connected with the carriage L*, are connected with two chain wheels 39*, $39^1$, like those 39, $39^{1*}$, before described; said wheels being secured upon two shafts 40*, $40^{1*}$, which are arranged in bearings 41*, $41^1$, supported by the platform I*, and these shafts carry two bevel wheels 42*, $42^1$, gearing with two toothed sectors 43*, $43^1$, on a long horizontal rockshaft 44*, which is arranged parallel with the front of the oven, just above the platform I*, in bearings in brackets 45*, 45*, attached to the front corner plates 46, 46, of the oven. The sectors 43*, $43^1$, are connected by rods 47*, $47^1$, with two pairs of arms 48*, $48^1$, which hang on the axles of the rollers 49, $49^{1*}$, of the arms 48, $48^{1*}$; and these arms 48*, $48^1$ carry rollers 49*, $49^1$, which rest against the cams 37, 38, and are operated upon by them to actuate the arms 48*, $48^1$, rods 47*, $47^1$, sectors 43*, $43^1$, bevel wheels 42*, $42^1$, shafts 40*, $40^1$, chain wheels 39*, $39^1$, and chains $t^*$, $t^1$, in the same manner as the mechanism before described for giving a similar motion to the carriage L*, that is to say to bring the said carriage at the proper time opposite the discharging door F*, to receive a car of baked bread or other substance or substances from the oven, and then to run the said carriage across to the receiving door $F^1$, and keep it stationary in front thereof till it has been reloaded and the car has been run into the oven again through the latter door. It may be observed that the hanging of the arms 48*, $48^1$, through which the cams actuate the lower carriage, upon the axles of the rollers 49, $49^{1*}$, of the arms 48, $48^{1*}$, does not interfere with the proper operation of either pair of arms as the lower arms are so proportioned that only one pair of arms is operated upon at a time by the cams 37, 38, only one carriage being required to move at a time.

The shaft X, in addition to the cams 31, $31^{1*}$, carries two cams 51, 52, and two similar ones $51^{1*}$, $52^{1*}$, for the purpose of giving the necessary motion to the shafts 21, $21^{1*}$, before described, by whose spur wheels 20, $20^{1*}$, the bars N, $N^{1*}$, are operated to draw the cars into and eject them from the oven, through the doors F, $F^{1*}$; and the shaft $X^1$ carries two similar cams $51^*$, $52^*$, and two others $51^1$, $52^1$, for the purpose of giving the necessary motion to the shafts $20^*$, $20^1$, by whose spur wheels $21^*$, $21^1$, the bars $N^*$, $N^1$, are operated to draw the cars into and eject them from the oven through the doors $F^*$, $F^1$.

I will first describe the arrangement and operation of the mechanism through which the cams 51, 52, act upon the shaft 21; and as the mechanism through which the other cams $51^{1*}$, $52^{1*}$, $51^*$, $52^*$, $51^1$, $52^1$, operate is exactly the same, it will merely require to be pointed out in the drawing.

Above the shaft 21, there is a rockshaft 53, working in bearings in two brackets 54, 54, attached to the casting W, said rockshaft carrying a toothed sector 55 (best shown in Fig. 5, but also shown in Fig. 3,) gearing with a small spur wheel 64, on shaft 21. This toothed sector has connected to it, by wrist pins 63, 63 on opposite sides of its shaft two rods 56, 57, to the lower ends of which are attached two rollers 58, 59, one of which rests on the cam 51, and the other on the cam 52, the said rods being held in proper condition for the cams to act against their rollers by two links 60, 61, which swing on a pin 62, secured in a stationary frame Y, that is secured to the back of the oven. The cam 51, acting upon the roller 58, and rod 56, moves the sector 55, in the proper direction for it to turn the wheel 64, and consequently the shaft 21, in the direction required for its wheel 20, acting upon the rack of the bar N, to drive said bar N forward through the oven; and the cam 52, acting upon the roller 59, and rod 57, moves the sector 55 in the proper direction for it to turn the wheel 64, and consequently the shaft 21, and wheel 20, in the opposite direction to draw back the bar and draw back a car into the oven. The relative forms of the two cams 51, 52, are such that they hold the sector steady whether in motion or at rest; neither cam allowing the sector to move any faster than the other requires. Above the shaft $21^{1*}$, is the rockshaft $53^{1*}$, working in bearings $54^{1*}$, $54^{1*}$, and carrying the sector $55^{1*}$, gearing with the wheel $64^{1*}$, on the shaft $21^{1*}$; said sector having connected with it the two rods $56^{1*}$, $57^{1*}$, carrying the rollers $58^{1*}$, $59^{1*}$, which rest upon the cams $51^{1*}$, $52^{1*}$, and said rods being held in proper position by the two links $60^{1*}$, $61^{1*}$. Below the two shafts $21^*$, and $21^1$, are arranged the two rockshafts $53^*$, and $53^1$, in bearings $54^*$ and $54^1$; said rockshafts carrying the sectors $55^*$, and $55^1$, which gear with the spur wheels $64^*$ and $64^1$, on the shafts $21^*$, and $21^1$, and have connected with them the rods $56^*$, $57^*$, and $56^1$, $57^1$, whose rollers $58^*$, $59^*$, and $58^1$, $59^1$, bear against the cams $51^*$, $52^*$, and $51^1$, $52^1$. The links $60^*$, $61^*$, (see Fig. 5) which keep the rods $56^*$ and $57^*$, in proper position, and the similar ones (not shown) which keep the rods $56^1$ and $57^1$, in proper position, are attached to fixed pins as shown at 62, (Fig. 5) secured in a frame Z, at the back of the oven.

The cars E, E, are constructed with bottoms of tile or soapstone, but preferably with tiles of fire-clay. The superiority of such materials for the interior portions of ovens is well understood by bakers. The construction of the bodies of the cars is well illustrated in Figs. 6, 7, and $7^*$, the first of which figures is a plan and the next a longitudinal section of one of the cars, on a larger scale than that on which they are shown in the views which represent them in the oven, and Fig. $7^*$ is a longitudinal section on a still larger scale of one of the fire-clay tiles. 65 is a quadrangular cast iron frame constituting the sides, front, and back of the car body, and strengthened by transverse bars 66, said transverse bars being of the same depth as the front of the car but of a much less depth than the back and sides of the car, as shown in Fig. 7. 67, 67, are a number of small square frames of light wrought iron fitting between the bars 66, as shown in Fig. 6, where some of the tiles are omitted or broken away to expose the said frames. These frames 67, are of a depth only about one half that of the bars 66, to which they are riveted or otherwise secured so as to leave about one half the depth of the latter standing above them, as shown in Fig. 7. The tiles 68 are made of the same size as the exteriors of the frames 67, but each with a lip 15, (see Fig. $7^*$) on one side to lap over and rest each on one of the bars 66, while the four sides of the tile are supported by the frames 67. The two sides and back of the frame 65, of the car stand up some distance above the tile-bottom, which not only strengthens the car but prevents the loaves or other articles slipping off in any direction, except at the front where the frame is covered by the tiles and no obstruction is offered to the slipping off of the loaves or other articles, as shown in Fig. 10, when either of the carriages L, L*, is tilted with the car upon it. By the above construction of the cars, provision is made for their discharging themselves, and the tiles which form a close flat bottom are confined securely in place, and if one or more should happen to be accidentally broken, the whole ones cannot be so far displaced as to fall out, and what is still more important, the bottoms of the tiles are left almost entirely exposed, so that the tops of the loaves or other articles below them are subjected to a gentle radiated heat from them; whereas if the cars had iron bottoms, the loaves or other articles below would have their tops scorched by the intense radiation of heat therefrom before they were properly baked. Instead of cars on wheels, trays constructed in a substantially similar manner to the bodies of the cars above described, and sliding into and from the oven, might be used; but generally the cars will be more convenient than the sliding trays.

In order to provide for the regulation of the temperature of the oven and to economize fuel, each of the outlet flues e, e, is fitted with a "butterfly" damper 69, (see Figs. 2, 3, and 5) which is made self-acting by the following means:—70, is a thin flat bar of iron or other metal, (see Figs. 4 and 5) extending right across the upper part of the oven and firmly secured at its ends by bolts 71, to the ends of the oven. This bar is longer than the distance between the points of attachment of its ends, and has to be deflected to get it into its place; such deflection being made in an upward direction from its ends. This deflection is increased more or less by its expansion when the oven becomes hot. At its highest part, the bar 70, passes through a slot in a link 90, suspended from the front end of a lever 72, which works through a hole in the back of the oven, on a fulcrum 73, (see Fig. 5). This lever and its connections with the damper are represented detached from the oven in Fig. 13, which is a side view. The outer or rear end of this lever carries a stud 74, on one side, (see Fig. 5) which stud works in the forked end of an arm 77, secured to a light horizontal shaft 75, which is fitted to turn in bearings in brackets 76, 76, (see Figs. 2 and 3) secured to the back of the oven. This shaft 75, carries near the flues e, e, two other arms 79, each of which has suspended from it a rod 80 (see Figs. 2 and 3) in which there is a slot (Fig. 2) to receive a stud 91, that is secured in one of two weighted levers 78, of the third order, which are secured one to the spindle of each of the "butterfly" dampers 69. The weights on the levers 78 exert a tendency to close the dampers 69, but as the studs 91 of the said levers cannot move below the bottom of the slots in the rods 80, the closing of the dampers is controlled by the arms 79, of the shaft 75, from which the said rods are suspended, and the position of these arms 79, depends on the degree of deflection of the expansion bar 70. The arms 79, are so adjusted that when the oven is at the lowest baking temperature, the dampers 69, are wide open; then as the temperature increases beyond this point, the increasing deflection of the bar 70, consequent upon its expansion causes the said bar to raise the inner end of the lever 72, by which means the stud 74, at the outer end thereof is caused to depress the arm 77, and turn the shaft 75, in such a direction that the arms 79 descend and allow the descent of the weighted damper levers 78; and as soon as these levers descend, the dampers begin to close; and this operation continues as the heat of the oven continues to increase, until the dampers are entirely closed. As the temperature falls again, an opposite effect is produced; the bar 70 straightening again as it contracts, and drawing down the inner end of the lever 72, and raising the arm 77, thus causing the arms 79 to rise and lift up the levers 78, thereby opening the dampers. The above regulating apparatus can be so adjusted as to close the dampers entirely at any given temperature; but, whenever the amount of dough in the oven is materially lessened, the temperature of the oven may continue to rise after communication from the fire to the chimney is closed by these dampers 69, in the flues; and therefore a pipe 81, (see Figs. 3, 4, 5, and 13) leading into the lower part of the back of the oven, and a pipe 82, communicating between the upper part of the oven and the chimney, are provided for the admission of an upward current of cold air through the oven to the chimney, which admission is effected by the opening of two dampers 83, 84, one fitted to the pipe 81, and the other to the pipe 82; the opening of the said dampers being performed by the action of an arm 92, that is secured on the shaft 75, and provided with a stud 93, that works in a slot 95, (see Fig. 13) in a rod 85, which connects two levers 94, attached one to each of the spindles of the two dampers 83, 84. The lower one of these levers, viz, that belonging to the damper 83, is weighted in such a manner as to exert a tendency to close the two dampers, and there is so much play allowed in the slot 95, for the stud 93, that the whole of the movement of the shaft 75 that is necessary to open and close the flue dampers 69, can be effected without any movement of the rod 85; but the continued movement of the shaft 75, produced by the continued expansion of the bar 70, after the dampers 69, have been closed, brings the stud 93, to the bottom of slot 95 and causes the depression of the rod 85, and of the ends of the levers 94, that are attached to said rod, thus opening the dampers 83, 84, and admitting a stream of air through the oven.

Having described an oven in which all the principles of my invention are fully carried out, I will remark that by using five sets of chains instead of three as above specified, four series of cars may be employed, viz., two ascending and two descending series; but such an arrangement, it is obvious, will require twice the number of doors and the duplication of the greater portion of the apparatus. Or, two sets of chains of similar construction may be used with a single series of ascending or descending cars; but it is obvious that with the two sets of chains, the principles of my invention would be but imperfectly carried out, and that the oven must of necessity be only to a certain extent automatic in its operation. I will further remark that a single set of chains may be employed, having brackets 96, rigidly attached to their links, as shown in Fig. 14, which is a front elevation; said brackets carrying tracks $h$, $h$, and being furnished with rollers 98, to run in fixed guides 97, in the front and back of the oven, as is shown in Fig. 15, which is a horizontal section of one-half the chain and its guides. By this arrangement, a series of ascending shelf-like supports and a series of descending ones are obtained with the use of only one series of chains; but I regard such an arrangement as very inferior to the employment of an arrangement of chains of which each only sustains one track or one edge of the support.

Instead of using only two endless chains on each pair of chain-shafts, sets consisting of a greater number may be employed to sustain the rails or track bars $h$, or chains may be so constructed with very broad links that a single chain on each pair of chain-shafts will do the duty performed by the pairs of chains described.

I am aware that endless chains or aprons have been used in ovens prior to my invention, to convey the bread from one door through which it is received into the oven to another through which, after having been baked it is discharged therefrom; but such chains or aprons have never been constructed, arranged or furnished so as to provide a compact series of ascending or descending horizontal shelf-like supports for the bread, similar to the system of chains and supports herein described, which possesses advantages over all other systems of chains or aprons in enabling an immensely greater quantity of bread or other substance to be contained in an oven occupying the same space, and in economizing heat; and it also permits the condensation of the alcoholic vapors evolved in the baking process by their coming in contact with the surfaces of the more recently introduced and consequently cooler loaves and the re-absorption of the alcoholic properties. In view of such prior use of endless chains or aprons, I do not intend to claim, generally, the use of of endless chains in connection with other the bread during the baking process; but

What I claim as my invention, and desire to secure by Letters Patent, is:—

The employment in an oven of a system of endless chains in connection with other machinery arranged and combined substantially as herein described, for the purpose of introducing dough or other material to be baked into the oven, keeping the same in motion therein and delivering the same therefrom when baked.

HIRAM BERDAN.

Witnesses:
H. A. V. POST,
O. MACDANIEL.

[FIRST PRINTED 1912.]